US011285760B2

(12) United States Patent
Honda

(10) Patent No.: US 11,285,760 B2
(45) Date of Patent: Mar. 29, 2022

(54) PNEUMATIC TIRE

(71) Applicant: The Yokohama Rubber Co., LTD., Tokyo (JP)

(72) Inventor: Hiroaki Honda, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 17/048,099

(22) PCT Filed: Apr. 9, 2019

(86) PCT No.: PCT/JP2019/015490
§ 371 (c)(1),
(2) Date: Oct. 16, 2020

(87) PCT Pub. No.: WO2019/203067
PCT Pub. Date: Oct. 24, 2019

(65) Prior Publication Data
US 2021/0155052 A1 May 27, 2021

(30) Foreign Application Priority Data
Apr. 17, 2018 (JP) .............................. JP2018-078939

(51) Int. Cl.
*B60C 11/11* (2006.01)
*B60C 11/12* (2006.01)
(Continued)

(52) U.S. Cl.
CPC ............ *B60C 11/11* (2013.01); *B60C 11/0302* (2013.01); *B60C 11/0311* (2013.01);
(Continued)

(58) Field of Classification Search
CPC ............. B60C 11/0302; B60C 11/1204; B60C 2011/0313; B60C 2011/0025;
(Continued)

(56) References Cited

U.S. PATENT DOCUMENTS

D778,228 S * 2/2017 Oraison ...................... D12/544
D846,486 S * 4/2019 Reygrobellet .............. D12/564
(Continued)

FOREIGN PATENT DOCUMENTS

JP 04-197806 A * 7/1992
JP H08-188014 7/1996
(Continued)

OTHER PUBLICATIONS

Machine translation for Japan 2017-128217 (Year: 2021).*
(Continued)

*Primary Examiner* — Steven D Maki
(74) *Attorney, Agent, or Firm* — Thorpe North & Western

(57) ABSTRACT

A pneumatic tire includes alternating first and second groove portions. The first groove portion intersects an equator and extends in a width direction. The second groove portion inclines from the first groove portion to a tread edge at a smaller angle relative to a circumferential direction than an angle of the first groove portion relative to the circumferential direction. The first groove portion communicates with the second groove portion of the lug groove adjacent in the circumferential direction. The first groove portion is on a stepping side of each lug groove. The second groove portions are curved or bent and an average angle of the second groove portions in an inner region is smaller than in an outer region. Shallow grooves having a bent point are formed on blocks. The blocks are defined by circumferential narrow grooves connecting the second groove portions adjacent in the circumferential direction and the lug grooves.

16 Claims, 4 Drawing Sheets

(51) Int. Cl.
*B60C 11/03* (2006.01)
*B60C 11/00* (2006.01)

(52) U.S. Cl.
CPC ... *B60C 11/1204* (2013.01); *B60C 2011/0025* (2013.01); *B60C 2011/0313* (2013.01); *B60C 2011/0348* (2013.01); *B60C 2011/0353* (2013.01); *B60C 2011/0369* (2013.01); *B60C 2011/1231* (2013.01); *B60C 2011/1254* (2013.01)

(58) Field of Classification Search
CPC ..... B60C 2011/1231; B60C 2011/1254; B60C 2011/0369
See application file for complete search history.

(56) References Cited

U.S. PATENT DOCUMENTS

| | | |
|---|---|---|
| 2007/0199633 A1 | 8/2007 | Hayashi |
| 2008/0188621 A1 | 8/2008 | Ichino et al. |
| 2017/0297379 A1 | 10/2017 | Higashiura |
| 2018/0072103 A1* | 3/2018 | Vantal ................. B60C 11/1204 |
| 2018/0093534 A1 | 4/2018 | Ishino |
| 2019/0217669 A1 | 7/2019 | Weber et al. |
| 2020/0114699 A9 | 4/2020 | Higashiura |

FOREIGN PATENT DOCUMENTS

| | | | |
|---|---|---|---|
| JP | 09-226323 A | * | 9/1997 |
| JP | 2004-058754 | | 2/2004 |
| JP | 1580034 A1 | * | 9/2005 |
| JP | 2010-174231 | | 8/2010 |
| JP | 2010-174231 A | * | 8/2010 |
| JP | 2010-254252 | | 11/2010 |
| JP | 4676959 | | 4/2011 |
| JP | 2016-074365 | | 5/2016 |
| JP | 2016-074365 A | * | 5/2016 |
| JP | 2017-128217 | | 7/2017 |
| JP | 2017-128217 A | * | 7/2017 |
| JP | 2017-190123 | | 10/2017 |
| JP | 2018-052422 | | 4/2018 |
| WO | WO 2005/105913 | | 11/2005 |
| WO | WO 2006/001202 | | 1/2006 |
| WO | WO 2017/092898 | | 6/2017 |
| WO | WO 2018/054561 | | 3/2018 |

OTHER PUBLICATIONS

Machine translation for Japan 2016-074365 (Year: 2021).*
Machine translation for Japan 2010-174231 (Year: 2021).*
Machine translation for Japan 09-226323 (Year: 2021).*
Machine translation for Japan 04-197806 (Year: 2021).*
Machine translation for Europe 1,580,034 (Year: 2021).*
International Search Report for International Application No. PCT/JP2019/015490 dated Jul. 2, 2019, 4 pages, Japan.

* cited by examiner

PNEUMATIC TIRE

TECHNICAL FIELD

The present technology relates to a pneumatic tire suitable as a heavy duty pneumatic tire and in particular relates to a pneumatic tire that improves traction characteristics in snow while excellently maintaining running performance and uneven wear resistance performance on unpaved roads.

BACKGROUND ART

Heavy duty pneumatic tires used in construction vehicles, such as dump trucks, are required to mainly have excellent driving performance (traction performance) on unpaved roads. Therefore, a block-based tread pattern including a large number of lug grooves extending in a tire width direction is employed (see, for example, Japan Patent No. 4676959).

Meanwhile, performances requested to various tires have been recently increasing, and the tires as described above are requested to improve traction characteristics in snow, in addition to the driving performance on unpaved roads. Furthermore, in addition to the tread pattern having the block base, due to use conditions, a frequency of braking and driving is high and also a frequency of sharp curve driving is high in the tire as described above. Thus, since uneven wear tends to be likely to occur, excellently maintaining or improving an uneven wear resistance is also requested.

SUMMARY

The present technology provides a pneumatic tire with improved traction characteristics in snow while running performance and uneven wear resistance performance on unpaved roads are excellently maintained.

A pneumatic tire according to an embodiment of the present technology in which a rotation direction is designated includes a tread portion, a pair of sidewall portions, and a pair of bead portions. The tread portion extends in a tire circumferential direction and forms an annular shape. The pair of sidewall portions are disposed on both sides of the tread portion. The pair of bead portions are disposed inward of the sidewall portions in a tire radial direction. The lug grooves that extend inward in a tire width direction from a tread edge on one side of a tire equator and intersect with the tire equator and the lug grooves that extend inward in the tire width direction from a tread edge on another side of the tire equator and intersect with the tire equator are arranged in alternation in a tire circumferential direction on an outer surface of the tread portion. The respective lug grooves include first groove portions and second groove portions. The first groove portion intersects with the tire equator and extends along the tire width direction. The second groove portion is inclined from one end of the first groove portion at an angle with respect to the tire circumferential direction smaller than an angle of the first groove portion with respect to the tire circumferential direction and extends to the tread edge. The first groove portion has another end communicating with the second groove portion of the lug groove adjacent in the tire circumferential direction. The first groove portion is located on a stepping side with respect to an end portion on the tread edge side of the lug groove. When a distance from the tire equator to the tread edge is denoted as W, a region between a position separated by 0.50 W in the tire width direction from the tire equator and the tire equator is referred to as an inner region, and a region between the position separated by 0.50 W in the tire width direction from the tire equator and the tread edge is referred to as an outer region, the second groove portions are curved or bent such that an average angle of the second groove portions with respect to the tire circumferential direction in the inner region becomes smaller than an average angle of the second groove portions with respect to the tire circumferential direction in the outer region. Circumferential narrow grooves that connect the mutual second groove portions adjacent in the tire circumferential direction on the one side or the other side of the tire equator are formed. A plurality of blocks are defined by the lug grooves and the circumferential narrow grooves. The blocks include center blocks and shoulder blocks. The center blocks are defined on the tire equator side with respect to the circumferential narrow grooves. The shoulder blocks are defined on the tread edge side with respect to the circumferential narrow grooves. A shallow groove having at least one bend point is formed on a road contact surface of each of the blocks.

In the embodiment according to the present technology, the shallow groove having the bent point is provided on the road contact surface of each block in the tire having a block-based tread pattern in which the plurality of blocks are defined by the lug grooves and the circumferential narrow grooves as described above to ensure traction performance on unpaved roads (hereinafter also referred to as off-road traction performance). This allows increasing an edge component and allows improving traction characteristics in snow. In particular, because the shallow groove has the bent point, a groove component in the tire circumferential direction and a groove component in the tire width direction can be increased in a well-balanced manner, and the traction characteristics in snow in the tire circumferential direction and the width direction can be efficiently improved.

In the embodiment of present technology, the following is preferable.

The shallow grooves formed in the center blocks have one ends that communicate with the circumferential narrow grooves. The shallow grooves have other ends that communicate with the second groove portions. Projection components of the shallow grooves when the shallow grooves formed in the center blocks are projected to the tire equator mutually do not overlap. By thus providing the shallow grooves having an appropriate shape in the center blocks located near the tire equator where a contribution to traction performance is large, traction characteristics in snow can be effectively improved. In addition, because the shallow grooves are disposed so as not to overlap as described above, excessive decrease in block rigidity can be avoided across an entire circumference of the tire, the traction characteristics in snow and the off-road traction performance in the tire circumferential direction can be excellently balanced, and the good traction characteristics in snow and off-road traction performance can be provided in a compatible manner to a high degree.

In the embodiment of present technology, the following is preferable. The shallow groove formed in the shoulder block has both ends that terminate in the block. The shallow groove is disposed on the stepping side with respect to a position of an apex inward in the tire width direction of a road contact surface of the shoulder block. Thus, while the decrease in rigidity of the shoulder blocks is suppressed, the edge component can be increased on the stepping side and performance on snow can be effectively improved. On the other hand, since there are no shallow grooves on a kicking-out side and block rigidity and an amount of rubber are ensured, uneven wear (heel and toe wear) can be effectively suppressed.

In the embodiment of present technology, the following is preferable. The first groove portion has an angle from 80° to 100° with respect to the tire circumferential direction. The shallow groove formed in the center block includes a part that intersects with the tire equator and linearly extends at an angle from 80° to 90° with respect to the tire circumferential direction. This allows ensuring the groove component in the tire width direction on a tire central portion (on the tire equator) where the contribution to traction performance is large and effectively improving traction characteristics in snow.

In the embodiment of present technology, the following is preferable. The average angle of the second groove portions with respect to the tire circumferential direction in the inner region is from 35° to 45°. The shallow groove formed in the center block includes a linear part. The linear part extends at an angle from 35° to 45° with respect to the tire circumferential direction and communicates with the circumferential narrow groove. This allows increasing the groove component in the tire circumferential direction and the groove component in the tire width direction in a well-balanced manner to the center block positioned near the tire equator where the contribution to traction performance is large and efficiently improving the traction characteristics in snow in the tire circumferential direction and the width direction.

In the embodiment of present technology, the following is preferable. The shallow groove formed in the shoulder block extends along an outer edge on the stepping side of the shoulder block at a position separated by from 8 mm to 12 mm from the outer edge on the stepping side of the shoulder block. By disposing the shallow grooves at the appropriate positions on the stepping side in this manner, the block rigidity can be ensured and an edge component on the stepping side can be increased in a well-balanced manner, and traction characteristics in snow can be improved, which are advantageous in suppressing uneven wear (heel and toe wear).

In the embodiment of present technology, the following is preferable. The shallow groove has a groove depth from 1 mm to 3 mm. This allows ensuring block rigidity and increasing the edge component in a well-balanced manner, which is advantageous in improving traction characteristics in snow.

In the embodiment of present technology, the following is preferable. A groove depth of the first groove portion of the lug groove is from 65% to 75% of a groove depth of the second groove portion. By adequately shallowing the first groove portion more than the second groove portion in this manner, the rigidity of the block adjacent to the first groove portion can be increased, which is advantageous in improving traction performance.

In the embodiment of present technology, the following is preferable. A groove depth of the circumferential narrow groove is from 75% to 85% of a groove depth of the second groove portion of the lug groove. By adequately shallowing the circumferential narrow groove more than the second groove portion of the lug groove in this manner, the rigidity of the block adjacent to the circumferential narrow groove can be increased, which is advantageous in improving traction performance.

In the embodiment of present technology, the following is preferable. The lug groove, such as a second groove portion of the lug groove, has a groove depth of from 15 mm to 25 mm. Additionally, the following is preferred. A tread rubber constituting the tread portion has JIS-A hardness from 61 to 70 and a modulus at 100% elongation from 2.0 MPa to 3.0 MPa. The embodiment of the present technology allows exhibiting excellent performance especially in traction performance and uneven wear resistance performance in a heavy duty pneumatic tire having such characteristics. Note that in the embodiment of the present technology, the "JIS hardness" is hardness measured using a type A durometer at a temperature of 23° C. in accordance with the durometer hardness test regulated in JIS K 6253. Additionally, the "modulus at 100% elongation" is a value measured under respective conditions of a tensile speed of 500 mm/minute and a temperature of 23° C. using a No. 3 dumbbell test piece in accordance with JIS K6251.

In the embodiment of the present technology, the "tread edges" refer to both ends of a tread-patterned part of the tire when the tire is mounted on a regular rim, inflated to a regular internal pressure, and unloaded (unloaded state). The "distance W from the tire equator to the tread edge in the tire width direction" in the embodiment of the present technology is equivalent to ½ of a developed tread width ("tread width" specified by JATMA) that is a linear distance between the tread edges measured along the tire width direction in the state described above. "Regular rim" is a rim defined by a standard for each tire according to a system of standards that includes standards on which tires are based, and refers to a "standard rim" in the case of JATMA, refers to a "design rim" in the case of TRA, and refers to a "measuring rim" in the case of ETRTO. In the system of standards, including standards with which tires comply, "regular internal pressure" is air pressure defined by each of the standards for each tire and is referred to as "maximum air pressure" in the case of JATMA, the maximum value being listed in the table "TIRE ROAD LIMITS AT VARIOUS COLD INFLATION PRESSURES" in the case of TRA, and is "INFLATION PRESSURE" in the case of ETRTO. However, "regular internal pressure" is 180 kPa in a case where a tire is a tire for a passenger vehicle.

DESCRIPTION OF EMBODIMENTS

Configurations of embodiments of the present technology will be described in detail below with reference to the accompanying drawings.

Figure 1:
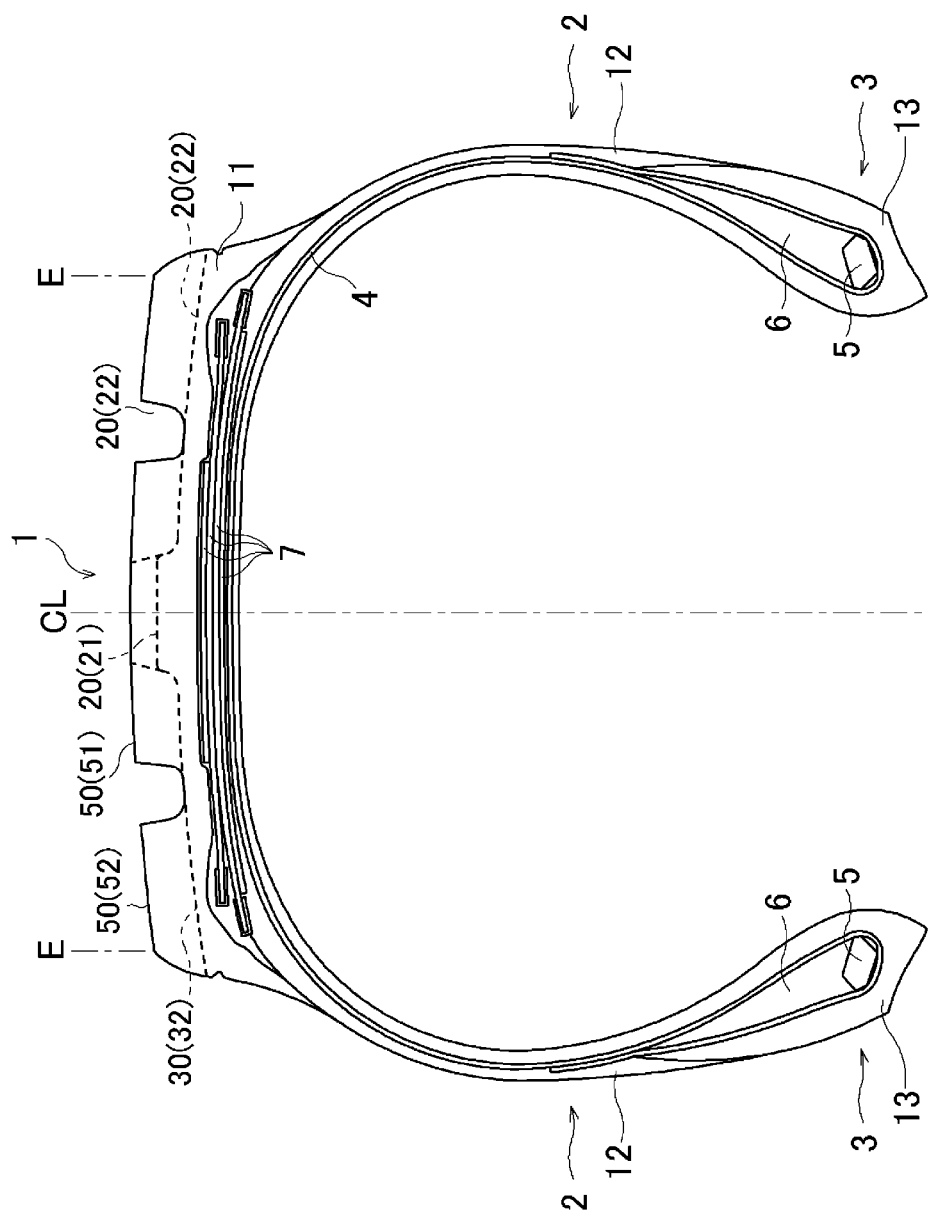
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed inward of the sidewall portions 2 in a tire radial direction. In FIG. 1, reference sign "CL" denotes a tire equator, and reference sign "E" denotes a tread edge. In the illustrated example, the tread edges E match with edges outward in a tire width direction of blocks outermost in the tire width direction (edge portions formed by road contact surfaces of the blocks outward in the tire width direction and side surfaces outward in the tire width direction). Although not illustrated in FIG. 1 as FIG. 1 is a meridian cross-sectional view, the tread portion 1, the sidewall portions 2, and the bead portions 3 each extend in a tire circumferential direction to form an annular shape. Thus, a toroidal basic structure of the pneumatic tire is configured. Although the description using FIG. 1 is basically based on the illustrated meridian cross-sectional shape, all of the tire components each extend in the tire circumferential direction and form the annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (four layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, an inclination angle of the reinforcing cords with respect to the tire circumferential direction is set in a range, for example, from 10° to 60°. Although not employed in the pneumatic tire of FIG. 1, in the embodiment of present technology, a belt reinforcing layer (not illustrated) can be additionally provided on the outer circumferential side of the belt layers 7. When the belt reinforcing layer is provided, the belt reinforcing layer includes, for example, an organic fiber cord oriented in the tire circumferential direction. An angle of the organic fiber cord with respect to the tire circumferential direction can be set to, for example, from 0° to 5°.

A tread rubber layer 11 is disposed on an outer circumferential side of the carcass layer 4 and the belt layers 7 in the tread portion 1. A side rubber layer 12 is disposed on an outer circumferential side of the carcass layer 4 (outward in the tire width direction) in the sidewall portions 2. A rim cushion rubber layer 13 is disposed on the outer circumferential side of the carcass layer 4 (outward in the tire width direction) in the bead portions 3. The tread rubber layer 11 may have a structure in which two types of rubber layers (a cap tread rubber layer and an undertread rubber layer) with differing physical properties are layered in the tire radial direction.

The embodiment of the present technology may be applied to such a general pneumatic tire; however, the cross-sectional structure thereof is not limited to the basic structure described above. Note that the embodiment according to the present technology mainly intends to be used as a heavy duty pneumatic tire. In this case, as the tread rubber layer 11, a rubber composition having JIS (Japanese Industrial Standard)-A hardness of preferably from 61 to 70 and more preferably from 61 to 65, and a modulus at 100% elongation of preferably from 2.0 MPa to 3.0 MPa, and more preferably from 2.0 MPa to 2.8 MPa is used.

Figure 2:
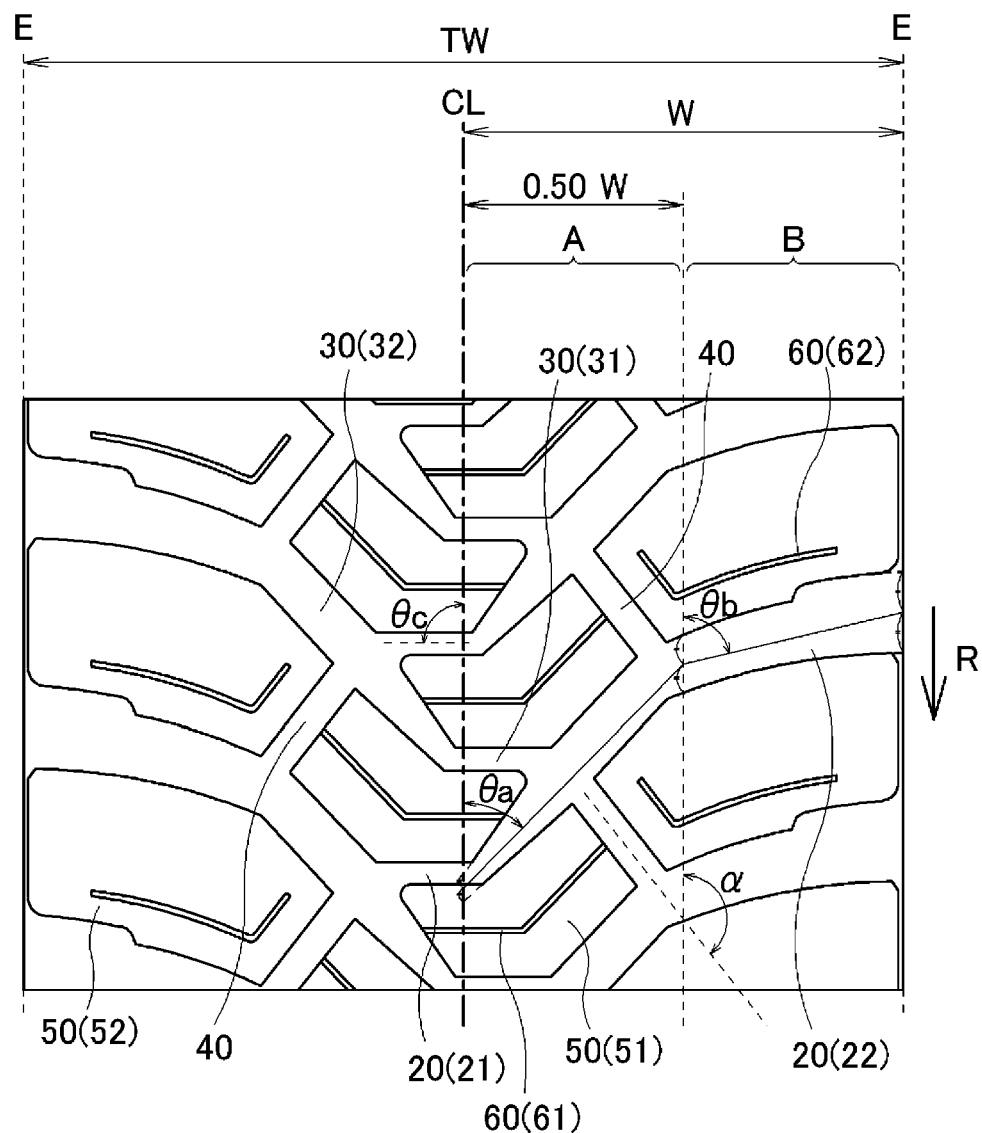
FIG. 2 is a front view illustrating a tread surface of the pneumatic tire according to the embodiment of the present technology.
Figure 3:
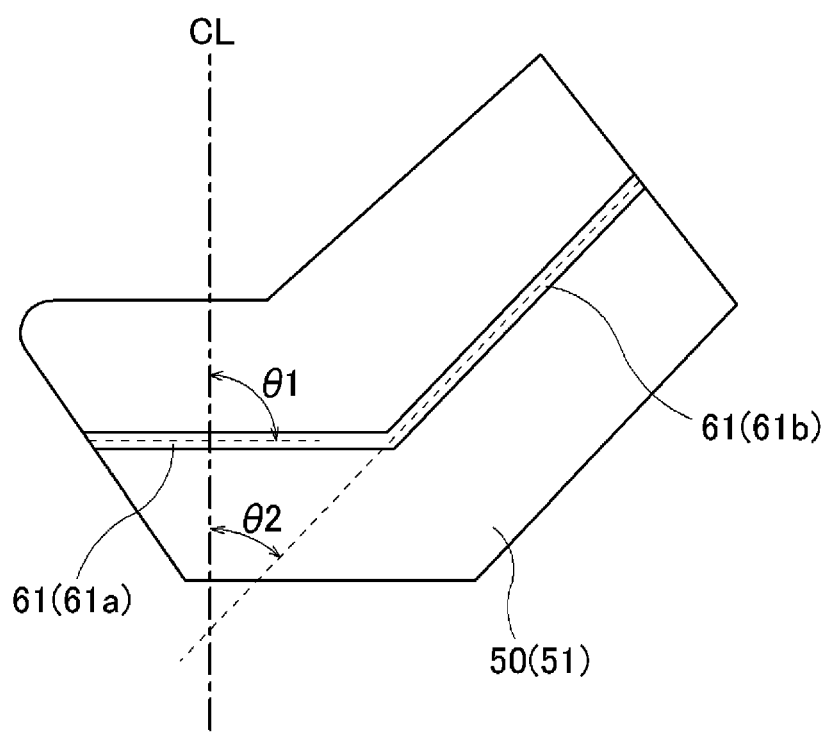
FIG. 3 is an explanatory diagram illustrating an enlarged center block according to the embodiment of the present technology.

As illustrated in FIG. 2, lug grooves 20 (may be referred to as "lug grooves 20 on one side" in the following description) and lug groove 30 (may be referred to as "lug grooves 30 on the other side" in the following description) are provided on a surface of the tread portion 1 of the pneumatic tire according to the embodiment of the present technology. The lug groove 20 extends from the tread edge E on one side (the right side in the drawing) of the tire equator CL inward in the tire width direction and intersects with the tire equator CL. The lug groove 30 extends from the tread edge E on the other side (the left side in the drawing) of the tire equator CL inward in the tire width direction and intersects with the tire equator CL. The plurality of lug grooves 20 on the one side and the plurality of lug grooves 30 on the other side are provided.

The lug grooves 20, 30 include first groove portions 21, 31 that intersect with the tire equator CL and extend along the tire width direction, and second groove portions 22, 32 that are inclined from one ends of the first groove portions 21, 31 at an angle smaller than that of the first groove portions 21, 31 with respect to the tire circumferential direction and extend up to the tread edges E, respectively. Specifically, the lug groove 20 on the one side includes the first groove portion 21 and the second groove portion 22. The first groove portion 21 intersects with the tire equator CL and extends along the tire width direction. The second groove portion 22 is inclined from the one end of the first groove portion 21 (the end portion on the one side (the right side in the drawing) of the tire equator) at the angle smaller than that of the first groove portion 21 with respect to the tire circumferential direction and extends up to the tread edge E. Similarly, the lug groove 30 on the other side includes the first groove portion 31 and the second groove portion 32. The first groove portion 31 intersects with the tire equator CL and extends along the tire width direction. The second groove portion 32 is inclined from the one end of the first groove portion 31 (the end portion on the other side (the left side in the drawing) of the tire equator) at the angle smaller than that of the first groove portion 31 with respect to the tire circumferential direction and extends up to the tread edge E.

The lug grooves 20 on the one side and the lug grooves 30 on the other side are arranged in the tire circumferential direction in alternation one by one. Note that, as described above, since the lug grooves 20, 30 basically extend in the mutually opposite directions from the tire equator CL, the first groove portions 21 of the lug grooves 20 on the one side and the first groove portions 31 of the lug grooves 30 on the other side are disposed in alternation in the tire circumferential direction on the tire equator CL. Meanwhile, the second groove portions 22 of the lug grooves 20 on the one side are arranged with intervals in the tire circumferential direction on the one side of the tire equator CL, and the second groove portions 32 of the lug grooves 30 on the other side are arranged with intervals in the tire circumferential direction on the other side of the tire equator CL. In the embodiment of the present technology, as long as the first groove portions 21, 31 are mutually arranged in alternation to be adjacent on the tire equator CL, the lug grooves 20, 30 are regarded as being arranged in alternation unless otherwise specified.

The other ends of the first groove portions 21, 31 of the respective lug grooves 20, 30 communicate with the second groove portions 32, 22 of the other lug grooves 30, 20 adjacent in the tire circumferential direction. In other words, the first groove portion 21 of the lug groove 20 on the one side communicates with the second groove portion 32 of the lug groove 30 on the other side adjacent in the tire circumferential direction, and the first groove portion 31 of the lug groove 30 on the other side communicates with the second groove portion 22 of the lug groove 20 on the one side adjacent in the tire circumferential direction.

The first groove portions 21, 31 of the respective lug grooves 20, 30 are located on a stepping side with respect to the end portions on the tread edge E side of the respective lug grooves 20, 30. That is, the pneumatic tire of the embodiment of the present technology is a tire in which a rotation direction R is designated. Meanwhile, the respective lug grooves 20, 30 have a shape inclined in a direction opposite to the rotation direction R from the tire equator CL side outward in the tire width direction as the entire groove.

When a distance from the tire equator CL to the tread edge E in the tire width direction is denoted as W, a region between a position separated by 0.50 W in the tire width direction from the tire equator CL and the tire equator CL is referred to as an inner region A, and a region between a position separated by 0.50 W in the tire width direction from the tire equator CL and the tread edge E is referred to as an outer region B, in the respective lug grooves 20, 30, the second groove portions 22, 32 are curved or bent such that an average angle θa of the second groove portions 22, 32 with respect to the tire circumferential direction in the inner region A becomes smaller than an average angle θb of the second groove portions 22, 32 with respect to the tire circumferential direction in the outer region B. In other words, the second groove portions 22, 32 of the lug grooves 20, 30 curve smoothly so that the inclination angles with respect to the tire circumferential direction gradually decrease from the tread edge E side toward the tire equator CL side, or are bent having at least one bend point.

Note that the average angle of the second groove portions 22, 32 of the lug grooves 20, 30 can be obtained as an angle formed by a straight line connecting the center points in groove width directions of the lug grooves 20, 30 at boundary positions of the respective regions and the tire circumferential direction. Note that, as illustrated, on the tire equator CL and the tread edge E, the center point of an extension line of the second groove portion 22, 32 drawn to the tire equator CL or the tread edge E on the tire equator CL or the tread edge E is used.

In the embodiment of the present technology, in addition to the lug grooves 20, 30, circumferential narrow grooves 40 are provided. The circumferential narrow groove 40 extends along the tire circumferential direction so as to connect the second groove portions adjacent in the tire circumferential direction on the one side of the tire equator CL, that is, the second groove portions 22 of the lug grooves 20 on the one side adjacent in the tire circumferential direction on the one side of the tire equator CL, or the second groove portions 32 of the lug grooves 30 on the other side adjacent in the tire circumferential direction on the other side of the tire equator CL.

The circumferential narrow groove 40 is a groove having a groove width smaller than those of the lug grooves 20, 30. Specifically, the lug grooves 20, 30 have the groove widths of, for example, from 5 mm to 30 mm, and a groove depth of, for example, from 8 mm to 25 mm. In particular, when the tire is the heavy duty pneumatic tire, the groove depth is preferably, for example, from 15 mm to 25 mm. In contrast to this, the circumferential narrow groove 40 has a groove width of, for example, from 7 mm to 11 mm, and a groove depth of, for example, from 15 mm to 20 mm.

The lug grooves 20, 30 and the circumferential narrow grooves 40 partition a plurality of blocks 50. Among the plurality of blocks 50, a block positioned on the tire equator CL side with respect to the circumferential narrow groove 40 is referred to as a center block 51 and a block positioned on the tread edge E side with respect to the circumferential narrow groove 40 is referred to as a shoulder block 52. At least a part of the center blocks 51 are present on the tire equator CL by the above-described groove shape.

A shallow groove 60 having at least one bend point is formed on the road contact surface of each block 50. The shallow groove 60 is a groove having a groove depth smaller than those of the lug grooves 20, 30 and the circumferential narrow groove 40, and the groove depth can be set to be preferably from 1 mm to 3 mm, and the groove width can be set to, for example, from 1 mm to 3 mm. When the groove depth of the shallow groove 60 is less than 1 mm, the shallow groove 60 is too shallow, and thus an effect brought by providing the shallow groove 60 cannot be obtained. The groove depth of the shallow groove 60 in excess of 3 mm increases an influence to block rigidity. In the following description, the shallow groove 60 formed in the center block 51 is referred to as a center shallow groove 61, and the shallow groove 60 formed in the shoulder blocks 52 is referred to as a shoulder shallow groove 62. In the illustrated example, the center shallow groove 61 and the shoulder shallow groove 62 both have one bent point. While the number of shallow grooves 60 formed in each block 50 is not particularly limited, one shallow groove 60 is preferably provided in each block 50 as illustrated in the drawing.

In the embodiment according to the present technology, the shallow groove 60 having the bent point is provided on the road contact surface of each block 50 in the tire having a block-based tread pattern in which the plurality of blocks 50 are defined by the lug grooves 20, 30 and the circumferential narrow grooves 40 as described above to ensure off-road traction performance. This allows increasing an edge component and allows improving traction characteristics in snow. In particular, because the shallow groove 60 has the bent point, a groove component in the tire circumferential direction and a groove component in the tire width direction can be increased in a well-balanced manner, and the traction characteristics in snow in the tire circumferential direction and the width direction can be efficiently improved.

As illustrated, the center shallow groove 61 preferably has one end communicating with the circumferential narrow groove 40 and the other end communicating with the second groove portion 22, 32 of the lug groove 20, 30. Additionally, the center shallow groove 61 preferably bends along an outer edge on the stepping side or a kicking-out side of the center block 51. At this time, the center shallow groove 61 is preferably disposed within a range of ±5 mm in the tire circumferential direction from the center position in the tire circumferential direction of the center block 51. Furthermore, it is preferred that projection components of the center shallow grooves 61 when the center shallow grooves 61 are projected to the tire equator CL do not overlap with one another. By thus providing the center shallow grooves 61 having the appropriate shape in the center blocks 51 located near the tire equator CL where a contribution to traction performance is large, traction characteristics in snow can be effectively improved. In addition, because the center shallow grooves 61 do not overlap as described above, excessive decrease in block rigidity can be avoided across the entire circumference of the tire, the traction characteristics in snow and the off-road traction performance in the tire circumferential direction can be excellently balanced, and the good traction characteristics in snow and off-road traction performance can be provided in a compatible manner to a high degree.

On the other hand, as illustrated, both ends of the shoulder shallow groove 62 preferably terminate in the shoulder block 52. Additionally, the shoulder shallow groove 62 preferably bends so as to run along an outer edge on the stepping side of the shoulder block 52. Additionally, the shoulder shallow groove 62 is preferably disposed on the stepping side with respect to a position of an apex inward in the tire width direction of the road contact surface of the shoulder block 52. In particular, the shoulder shallow grooves 62 are preferably disposed at a position separated by from 8 mm to 12 mm from the outer edge on the stepping side of the shoulder block 52. By providing the shoulder shallow grooves 62 in this manner, while the decrease in rigidity of the shoulder blocks 52 is suppressed, the edge component can be increased on the stepping side and performance on snow can be effectively improved. On the other hand, since there are no shallow grooves on the kicking-out side and block rigidity and an amount of rubber are ensured, uneven wear (heel and toe wear) can be effectively suppressed. When a separation distance between the outer edge on the stepping side of the shoulder block 52 and the shoulder shallow groove 62 is less than 8 mm, the shoulder shallow groove 62 approaches the block outer edge too much, thereby reducing the durability of the block. When the separation distance between the outer edge on the stepping side of the shoulder block 52 and the shoulder shallow groove 62 is exceeds 12 mm, the shoulder shallow groove 62 is too far from the block outer edge, so an effect brought by disposing the shoulder shallow groove 62 on the stepping side is not sufficiently expected.

In the embodiment of the present technology, while the lug grooves 20, 30 and the circumferential narrow grooves 40 can be appropriately set according to the performance to be emphasized in this tire, the following structure is preferable to improve traction performance.

The first groove portions 21, 31 of the lug grooves 20, 30 are provided to ensure mainly the groove component in the tire width direction near the tire equator CL where the contribution to traction performance is large. Accordingly, the first groove portions 21, 31 preferably extend in a direction substantially perpendicular to the tire circumferential direction. Specifically, an angle θc of the first groove portions 21, 31 with respect to the tire circumferential direction is preferably from 80° to 100°. This allows efficiently improving traction performance by the first groove portions 21, 31. When the angle θc of the first groove portions 21, 31 is less than 80° or greater than 100°, the inclination of the first groove portions 21, 31 with respect to the tire width direction increases and the groove component in the tire width direction cannot be sufficiently ensured, and thus the effect of improving traction performance is limited.

In the second groove portions 22, 32 of the lug grooves 20, 30, to gradually decrease the angle with respect to the tire circumferential direction to the tire equator as described above, the average angle θa of the second groove portions 22, 32 with respect to the tire circumferential direction in the inner region A is preferably set to be from 35° to 45°, and the average angle θb of the second groove portions 22, 32 with respect to the tire circumferential direction in the outer region B is preferably set to be from 70° to 85°. This provides the good angles at the respective portions of the second groove portions 22, 32 and good curves or bent shapes of the second groove portions 22, 32. Accordingly, lug groove lengths are increased, which is advantageous in improving traction performance. The average angle θa of the second groove portions 22, 32 of less than 35° decreases the groove component in the tire width direction, and this makes it difficult to sufficiently improve traction performance. When the average angle θa of the second groove portions 22, 32 exceeds 45°, a difference with the average angle θb becomes small, the second groove portions 22, 32 cannot be sufficiently bent or curved, and the lug groove lengths do not sufficiently increase, making it difficult to sufficiently improve traction performance. When the average angle θb of the second groove portions 22, 32 is less than 70°, the difference with the average angle θa becomes small, the second groove portions 22, 32 cannot be sufficiently bent or curved, and the lug groove lengths do not sufficiently increase, making it difficult to sufficiently improve traction performance. When the average angle θb of the second groove portions 22, 32 exceeds 85°, the difference with the average angle θa becomes large, and the second groove portions 22, 32 are curved or bent greatly, making it difficult to ensure the good groove shapes.

The circumferential narrow grooves 40 are preferably disposed at extended positions of the other ends of the first groove portions 21, 31 of the lug grooves 20, 30. With such a configuration, for example, when the groove is tracked from the tread edge E on the one side, the groove goes through the first groove portion 21 from the second groove portion 22 of the lug groove 20 on the one side, crosses the lug groove 30 (second groove portion 32) on the other side, and then reaches the circumferential narrow groove 40 on the other side of the tire equator CL. These grooves are disposed in a well-balanced manner as a series of grooves, which is advantageous in improving traction performance. Note that when the groove is tracked from the tread edge E on the other side, the groove goes through the first groove portion 31 from the second groove portion 32 of the lug groove 30 on the other side, crosses the lug groove 20 (the second groove portion 22) on the one side, and then reaches the circumferential narrow groove 40 on the one side of the tire equator CL.

While the circumferential narrow groove 40 is a groove intended to add the groove component in the tire circumferential direction, the circumferential narrow groove 40 is preferably inclined appropriately with respect to the tire circumferential direction to provide the groove component in the tire width direction, in addition to the groove component in the tire circumferential direction. Therefore, the circumferential narrow grooves 40 preferably extend substantially perpendicular to the lug grooves 20, 30. Specifically, the difference between the average angle θa of the second groove portions 22, 32 with respect to the tire circumferential direction in the inner region A and an inclination angle α of the circumferential narrow groove 40 with respect to the tire circumferential direction is preferably within a range 90°±10°. This provides the good shape to the circumferential narrow groove 40 and a good balance between the groove component in the tire circumferential direction and the groove component in the tire width direction, which are advantageous in improving traction performance. When the difference between the average angle θa and the angle α is outside the range of 90°±10°, the groove component in the tire circumferential direction or the tire width direction increases and the balance between the respective groove components becomes poor, and thus the effect of improving traction performance is limited.

In contrast, the center shallow groove 61 preferably includes a part that intersects with the tire equator CL and linearly extends at an angle of from 80° to 90° with respect to the tire circumferential direction and a linear part that extends at an angle from 35° to 45° with respect to the tire circumferential direction and communicates with the circumferential narrow groove 40. For example, in the illustrated example, the center shallow groove 61 includes a first part 61a and a second part 61b. The first part 61a linearly extends from the bend point to the second groove portion 22, 32. The second part 61b linearly extends from the bend point to the circumferential narrow groove 40. At this time, an angle θ1 of the first part 61a with respect to the tire circumferential direction is preferably from 80° to 90°, and an angle θ2 of the second part 61b with respect to the tire circumferential direction is preferably from 35° to 40°. Accordingly, the first part 61a allows ensuring the groove component in the tire width direction at the tire central portion (on the tire equator) where the contribution to traction performance is large and effectively improving traction characteristics in snow. The second part 61b allows increasing the groove component in the tire circumferential direction and the groove component in the tire width direction in a well-balanced manner and efficiently improving the traction characteristics in snow in the tire circumferential direction and the width direction.

At this time, when the angle θ1 of the first part 61a of the center shallow groove 61 is less than 80° or exceeds 90°, the inclination of the first part 61a with respect to the tire width direction increases, the groove component in the tire width direction cannot be sufficiently ensured, and the effect of improving traction performance is limited. When the angle θ2 of the second part 61b of the center shallow groove 61 is less than 35° or exceeds 45°, the groove component in the tire width direction or the tire circumferential direction decreases, and the balance between these groove components is reduced. To set the angles θ1, θ2 of the respective parts of the center shallow groove 61, the angle θ1 of the first part 61a is preferably the approximately same as the angle θc of the first groove portions 21, 31 of the lug grooves 20, 30, and the angle θ2 of the second part 61b is preferably the approximately same as the average angle θa of the second groove portions 22, 32 of the lug grooves 20, 30. Specifically, a difference|θ1−θc| between the angle θ1 of the first part 61a of the center shallow groove 61 and the angle θc of the first groove portions 21, 31 of the lug grooves 20, 30 is preferably within 10°, and a difference|θ2−θa| between the angle θ2 of the second part 61b of the center shallow groove 61 and the average angle θa of the second groove portions 22, 32 of the lug grooves 20, 30 is preferably within 10°.

While the lug grooves 20, 30 may have the uniform groove depth entirely, the first groove portions 21, 31 are preferably configured to be appropriately shallower than the second groove portions 22, 32. Specifically, the groove depth of the first groove portions 21, 31 of the lug grooves 20, 30 is preferably from 65% to 75% of the groove depth of the second groove portions 22, 32. This allows increasing the rigidity of the block (center block 51) adjacent to the first groove portions 21, 31, which is advantageous in improving traction performance. When the groove depth of the first groove portions 21, 31 is less than 65% of the groove depth of the second groove portions 22, 32, the first groove portions 21, 31 become too shallow, making it difficult to sufficiently exhibit an edge effect as a groove. The groove depth of the first groove portions 21, 31 in excess of 75% of the groove depth of the second groove portions 22, 32 substantially eliminates the difference in groove depth between the first groove portions 21, 31 and the second groove portions 22, 32, and the effect brought by changing the groove depth is not sufficiently expected.

While the respective groove depths of the lug grooves 20, 30 and the circumferential narrow groove 40 can be set to be the above-described ranges, the circumferential narrow groove 40 is preferably configured to be adequately shallower than the lug grooves 20, 30. Specifically, the groove depth of the circumferential narrow groove 40 is set to be preferably from 75% to 85% of the groove depth of the second groove portions 22, 32 of the lug grooves 20, 30. By adequately shallowing the circumferential narrow groove 40 more than the second groove portions 22, 32 in this manner, the rigidity of the blocks adjacent to the circumferential narrow grooves 40 (the center block 51 and the shoulder block 52) can be increased, which is advantageous in improving traction performance. When the groove depth of the circumferential narrow groove 40 is less than 75% of the groove depth of the second groove portions 22, 32, the circumferential narrow groove 40 becomes too shallow, making it difficult to sufficiently exhibit the edge effect as a groove. The groove depth of the circumferential narrow groove 40 in excess of 85% of the groove depth of the second groove portions 22, 32 substantially eliminates the difference in groove depth between the circumferential narrow groove 40 and the second groove portions 22, 32, and the effect brought by changing the groove depth is not sufficiently expected.

Example 22 types of pneumatic tires of Conventional Example 1 and Examples 1 to 21 having a tire size of 315/80R22.5 and the basic structure illustrated in FIG. 1 as an example and in which the based tread pattern, the average angle θa of the second groove portion of the lug groove with respect to the tire circumferential direction in the inner region A, the average angle θb of the second groove portion of the lug groove with respect to the tire circumferential direction in the outer region B, the angle θc of the first groove portion of the lug groove with respect to the tire circumferential direction, the magnitude relationship between the average angles θa and θb, the presence of the shallow groove, the groove depth of the shallow groove, the shape of the shallow groove, the shape of the center shallow groove, the presence of overlap of the projection components when the center shallow grooves are projected to the tire equator (overlap of the center shallow grooves), the angle θ1 of the first part of the center shallow groove, the angle θ2 of the second part of the center shallow groove, the shape of the shoulder shallow groove, the separation distance of the shoulder shallow groove from the outer edge on the stepping side of the shoulder block, the groove depth of the second groove portion of the lug groove, a ratio of the groove depth of the first groove portion of the lug groove to the groove depth of the second groove portion of the lug groove (%), a ratio of the groove depth of the circumferential narrow groove to the groove depth of the second groove portion of the lug groove (%), the hardness of the rubber composition (tread rubber) constituting the tread portion, and the modulus at 100% elongation of the rubber composition (tread rubber) constituting the tread portion were each set as shown in Tables 1 and 2 were manufactured.

The corresponding drawings numbers are described in the "tread pattern" columns in Tables 1 and 2. Note that although the pattern of Conventional Example 1 (FIG. 4) differs greatly from the pattern of FIG. 2, for example, angles of respective portions were made to correspond to FIG. 2 as described in the drawing to obtain values of the respective items. The "Shape of center shallow groove" columns of Tables 1 and 2 indicate whether the center shallow groove communicates with the lug groove and the circumferential narrow groove. "Communicating" means communication and "Terminating" means no communication. The "Shape of shoulder shallow groove" columns of Tables 1 and 2 indicate whether the shoulder shallow groove terminates in the shoulder block. "Terminating" means the termination in the block and "Communicating" means that the shoulder shallow groove does not terminate in the block but communicates with, for example, the circumferential narrow groove.

These pneumatic test tires were evaluated for traction characteristics in snow, uneven wear resistance performance, and off-road traction performance by the following evaluation method. Tables 1 and 2 show the results.

Traction Characteristics in Snow

The respective test tires were mounted on wheels having a rim size of 22.5×9.00, adjusted to have an air pressure of 850 kPa, and mounted on a drive shaft of a test vehicle (truck with an axle arrangement of 6×4). The test tires were each subjected to sensory evaluation by a test driver on a test course of a snow road. Evaluation results are expressed as index values with Conventional Example 1 being assigned the index value of 100. Larger index values indicate excellent snow traction characteristics.

Uneven Wear Resistance Performance

The respective test tires were assembled on wheels having a rim size of 22.5×9.00, adjusted to have an air pressure of 850 kPa, and mounted on a drive shaft of a test vehicle (truck with an axle arrangement of 6×4). An amount of wear (heel and toe wear) of a block after performing pattern running of 40000 km was measured. The evaluation results are expressed as indices using the reciprocal of the measurement values, with the Conventional Example 1 being assigned the index of 100. Larger index values mean the small amount of wear and excellent uneven wear resistance performance.

Off-Road Traction Performance

The respective test tires were mounted on wheels having a rim size of 22.5×9.00, adjusted to have an air pressure of 850 kPa, and mounted on a drive shaft of a test vehicle (truck with an axle arrangement of 6×4). The test tires were each subjected to sensory evaluation by a test driver on a test course of an unpaved road. Evaluation results are expressed as index values with Conventional Example 1 being assigned the index value of 100. Larger index values indicate excellent off-road traction performance.

TABLE 1-1

Figure 4:
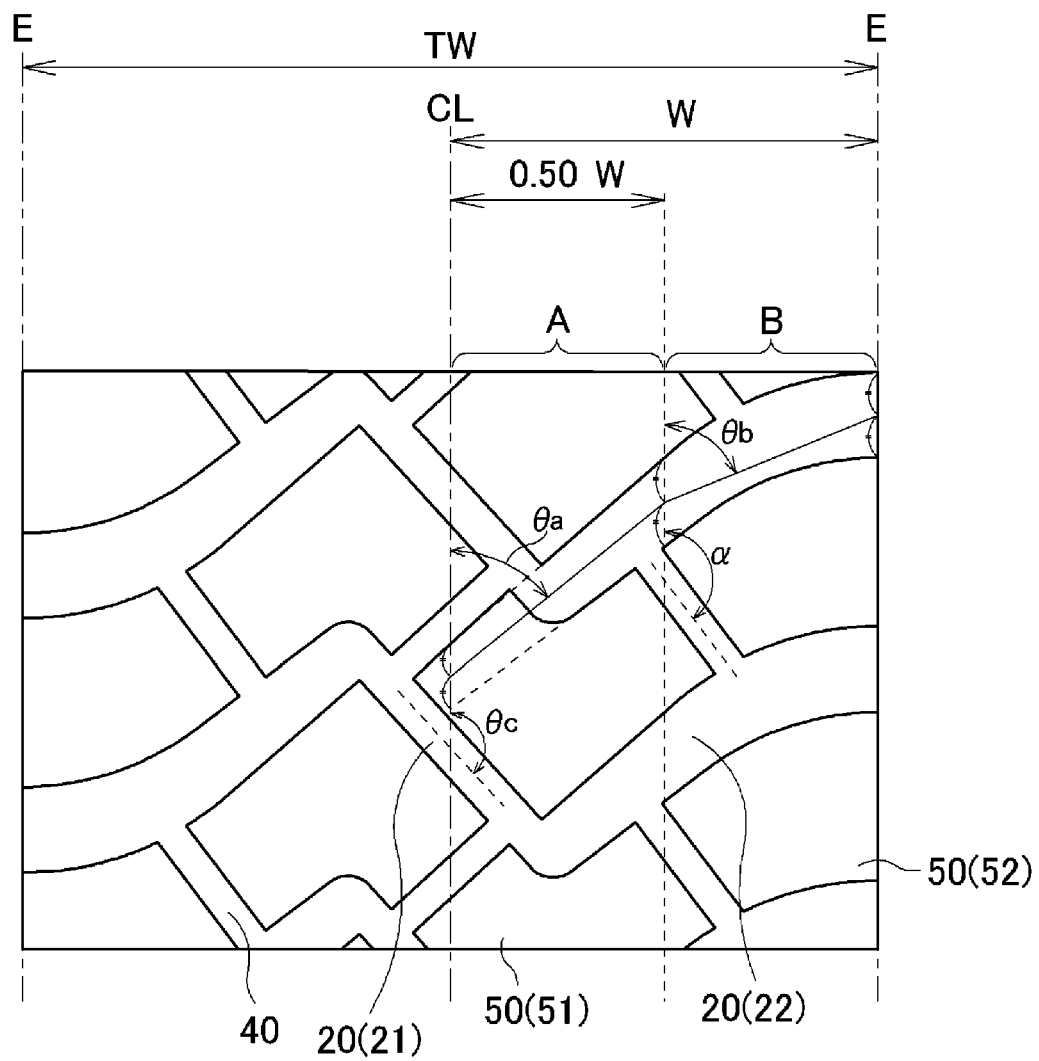
FIG. 4 is a front view illustrating an example of a tread surface of a conventional pneumatic tire.

|  |  | Conventional Example 1 | Example 1 | Example 2 | Example 3 |
|---|---|---|---|---|---|
| Tread pattern |  | FIG. 4 | FIG. 2 | FIG. 2 | FIG. 2 |
| θa | ° | 51 | 80 | 80 | 80 |
| θb | ° | 68 | 85 | 85 | 85 |
| θc | ° | 138 | 75 | 75 | 75 |
| Magnitude relationship between θa and θb |  | θa < θb | θa < θb | θa < θb | θa < θb |
| Presence of shallow groove |  | No | Yes | Yes | Yes |
| Groove depth of shallow groove | mm | — | 2 | 2 | 2 |
| Shape of center shallow groove |  | — | Communicating | Terminating | Communicating |
| Overlap of center shallow grooves |  | — | Yes | No | No |
| θ1 | ° | — | 75 | 75 | 75 |
| θ2 | ° | — | 50 | 50 | 50 |
| Shape of shoulder shallow groove |  | — | Terminating | Terminating | Communicating |
| Separation distance of shoulder shallow groove | mm | — | 7 | 7 | 7 |
| Groove depth of second groove portion | mm | 22 | 22 | 22 | 22 |
| Groove depth of first groove portion | % | 40 | 40 | 40 | 40 |
| Groove depth of circumferential narrow groove | % | 70 | 70 | 70 | 70 |
| Tread rubber hardness |  | 63 | 60 | 60 | 60 |
| Modulus of tread rubber | MPa | 2.4 | 1.9 | 1.9 | 1.9 |
| Traction characteristics in snow | Index value | 100 | 107 | 103 | 104 |
| Uneven wear resistance performance | Index value | 100 | 105 | 105 | 105 |
| Off-road traction performance | Index value | 100 | 100 | 100 | 100 |

TABLE 1-2

|  |  | Example 4 | Example 5 | Example 6 | Example 7 |
|---|---|---|---|---|---|
| Tread pattern |  | FIG. 2 | FIG. 2 | FIG. 2 | FIG. 2 |
| θa | ° | 80 | 80 | 80 | 80 |
| θb | ° | 85 | 85 | 85 | 85 |
| θc | ° | 80 | 100 | 90 | 90 |
| Magnitude relationship between θa and θb |  | θa < θb | θa < θb | θa < θb | θa < θb |
| Presence of shallow groove |  | Yes | Yes | Yes | Yes |
| Groove depth of shallow groove | mm | 2 | 2 | 2 | 2 |
| Shape of center shallow groove |  | Communicating | Communicating | Communicating | Communicating |
| Overlap of center shallow grooves |  | No | No | No | No |
| θ1 | ° | 80 | 80 | 80 | 90 |
| θ2 | ° | 50 | 50 | 50 | 50 |
| Shape of shoulder shallow groove |  | Terminating | Terminating | Terminating | Terminating |
| Separation distance of shoulder shallow groove | mm | 7 | 7 | 7 | 7 |
| Groove depth of second groove portion | mm | 22 | 22 | 22 | 22 |
| Groove depth of first groove portion | % | 40 | 40 | 40 | 40 |
| Groove depth of circumferential narrow groove | % | 70 | 70 | 70 | 70 |
| Tread rubber hardness |  | 60 | 60 | 60 | 60 |
| Modulus of tread rubber | MPa | 1.9 | 1.9 | 1.9 | 1.9 |
| Traction characteristics in snow | Index value | 104 | 106 | 106 | 107 |
| Uneven wear resistance performance | Index value | 104 | 104 | 103 | 102 |
| Off-road traction performance | Index value | 106 | 106 | 104 | 104 |

TABLE 1-3

|  |  | Example 8 | Example 9 | Example 10 |
|---|---|---|---|---|
| Tread pattern |  | FIG. 2 | FIG. 2 | FIG. 2 |
| θa | ° | 80 | 45 | 50 |
| θb | ° | 85 | 80 | 80 |
| θc | ° | 90 | 90 | 90 |
| Magnitude relationship between θa and θb |  | θa < θb | θa < θb | θa < θb |
| Presence of shallow groove |  | Yes | Yes | Yes |
| Groove depth of shallow groove | mm | 2 | 2 | 2 |
| Shape of center shallow groove |  | Communicating | Communicating | Communicating |
| Overlap of center shallow grooves |  | No | No | No |
| θ1 | ° | 90 | 90 | 90 |
| θ2 | ° | 45 | 30 | 35 |

TABLE 1-3-continued

|  |  | Example 8 | Example 9 | Example 10 |
|---|---|---|---|---|
| Shape of shoulder shallow groove |  | Terminating | Terminating | Terminating |
| Separation distance of shoulder shallow groove | mm | 7 | 7 | 7 |
| Groove depth of second groove portion | mm | 22 | 22 | 22 |
| Groove depth of first groove portion | % | 40 | 40 | 40 |
| Groove depth of circumferential narrow groove | % | 70 | 70 | 70 |
| Tread rubber hardness |  | 60 | 60 | 60 |
| Modulus of tread rubber | MPa | 1.9 | 1.9 | 1.9 |
| Traction characteristics in snow | Index value | 109 | 108 | 110 |
| Uneven wear resistance performance | Index value | 106 | 108 | 108 |
| Off-road traction performance | Index value | 104 | 108 | 110 |

TABLE 2-1

| Tread pattern |  | Example 11 FIG. 2 | Example 12 FIG. 2 | Example 13 FIG. 2 | Example 14 FIG. 2 |
|---|---|---|---|---|---|
| θa | ° | 35 | 40 | 40 | 40 |
| θb | ° | 80 | 80 | 80 | 80 |
| θc | ° | 90 | 90 | 90 | 90 |
| Magnitude relationship between θa and θb |  | θa < θb | θa < θb | θa < θb | θa < θb |
| Presence of shallow groove |  | Yes | Yes | Yes | Yes |
| Groove depth of shallow groove | mm | 2 | 2 | 2 | 1 |
| Shape of center shallow groove |  | Communicating | Communicating | Communicating | Communicating |
| Overlap of center shallow grooves |  | No | No | No | No |
| θ1 | ° | 90 | 90 | 90 | 90 |
| θ2 | ° | 40 | 40 | 40 | 40 |
| Shape of shoulder shallow groove |  | Terminating | Terminating | Terminating | Terminating |
| Separation distance between shoulder shallow groove | mm | 7 | 8 | 12 | 10 |
| Groove depth of second groove portion | mm | 22 | 22 | 22 | 22 |
| Groove depth of first groove portion | % | 40 | 40 | 40 | 40 |
| Groove depth of circumferential narrow groove | % | 70 | 70 | 70 | 70 |
| Tread rubber hardness |  | 60 | 60 | 60 | 60 |
| Modulus of tread rubber | MPa | 1.9 | 1.9 | 1.9 | 1.9 |
| Traction characteristics in snow | Index value | 110 | 111 | 113 | 110 |
| Uneven wear resistance performance | Index value | 109 | 110 | 111 | 112 |
| Off-road traction performance | Index value | 107 | 112 | 112 | 114 |

TABLE 2-2

|  |  | Example 15 | Example 16 | Example 17 | Example 18 |
|---|---|---|---|---|---|
| Tread pattern |  | FIG. 2 | FIG. 2 | FIG. 2 | FIG. 2 |
| θa | ° | 40 | 40 | 40 | 40 |
| θb | ° | 80 | 80 | 80 | 80 |
| θc | ° | 90 | 90 | 90 | 90 |
| Magnitude relationship between θa and θb |  | θa < θb | θa < θb | θa < θb | θa < θb |
| Presence of shallow groove |  | Yes | Yes | Yes | Yes |
| Groove depth of shallow groove | mm | 4 | 3 | 3 | 3 |
| Shape of center shallow groove |  | Communicating | Communicating | Communicating | Communicating |
| Overlap of center shallow grooves |  | No | No | No | No |
| θ1 | ° | 90 | 90 | 90 | 90 |
| θ2 | ° | 40 | 40 | 40 | 40 |
| Shape of shoulder shallow groove |  | Terminating | Terminating | Terminating | Terminating |
| Separation distance between shoulder shallow groove | mm | 10 | 10 | 10 | 10 |
| Groove depth of second groove portion | mm | 22 | 22 | 22 | 22 |
| Groove depth of first groove portion | % | 40 | 65 | 75 | 70 |
| Groove depth of circumferential narrow groove | % | 70 | 70 | 75 | 85 |
| Tread rubber hardness |  | 60 | 60 | 60 | 60 |
| Modulus of tread rubber | MPa | 1.9 | 1.9 | 1.9 | 1.9 |
| Traction characteristics in snow | Index value | 118 | 117 | 119 | 118 |
| Uneven wear resistance performance | Index value | 112 | 113 | 109 | 111 |
| Off-road traction performance | Index value | 114 | 117 | 114 | 116 |

TABLE 2-3

|  |  | Example 19 | Example 20 | Example 21 |
|---|---|---|---|---|
| Tread pattern |  | FIG. 2 | FIG. 2 | FIG. 2 |
| θa | ° | 40 | 40 | 40 |
| θb | ° | 80 | 80 | 80 |
| θc | ° | 90 | 90 | 90 |
| Magnitude relationship between θa and θb |  | θa < θb | θa < θb | θa < θb |
| Presence of shallow groove |  | Yes | Yes | Yes |
| Groove depth of shallow groove | mm | 3 | 3 | 3 |
| Shape of center shallow groove |  | Communicating | Communicating | Communicating |
| Overlap of center shallow grooves |  | No | No | No |
| θ1 | ° | 90 | 90 | 90 |
| θ2 | ° | 40 | 40 | 40 |
| Shape of shoulder shallow groove |  | Terminating | Terminating | Terminating |

TABLE 2-3-continued

|  |  | Example 19 | Example 20 | Example 21 |
|---|---|---|---|---|
| Separation distance between shoulder shallow groove | mm | 10 | 10 | 10 |
| Groove depth of second groove portion | mm | 22 | 22 | 22 |
| Groove depth of first groove portion | % | 70 | 70 | 70 |
| Groove depth of circumferential narrow groove | % | 85 | 85 | 80 |
| Tread rubber hardness |  | 61 | 65 | 63 |
| Modulus of tread rubber | MPa | 2 | 2.8 | 2.4 |
| Traction characteristics in snow | Index value | 120 | 117 | 119 |
| Uneven wear resistance performance | Index value | 113 | 109 | 111 |
| Off-road traction performance | Index value | 117 | 120 | 118 |

As can be seen from Tables 1 and 2, all of Examples 1 to 21 improved traction characteristics and uneven wear resistance performance compared to those of Conventional Example 1.

The invention claimed is:

1. A pneumatic tire in which a rotation direction is designated, comprising:
    a tread portion that extends in a tire circumferential direction and forms an annular shape;
    a pair of sidewall portions disposed on both sides of the tread portion;
    a pair of bead portions disposed inward of the sidewall portions in a tire radial direction;
    lug grooves that extend inward in a tire width direction from a tread edge on one side of a tire equator and intersect with the tire equator and lug grooves that extend inward in the tire width direction from a tread edge on another side of the tire equator and intersect with the tire equator being arranged in alternation in a tire circumferential direction on an outer surface of the tread portion;
    the respective lug grooves each include a first groove portion and a second groove portion, the first groove portion intersecting with the tire equator and extending along the tire width direction, the second groove portion being inclined from one end of the first groove portion at an angle with respect to the tire circumferential direction smaller than an angle of the first groove portion with respect to the tire circumferential direction and extending to the tread edge, the first groove portion having another end communicating with the second groove portion of the lug groove adjacent in the tire circumferential direction, the first groove portion being located on a stepping side with respect to an end portion on the tread edge side of the lug groove;
    when a distance from the tire equator to the tread edge is denoted as W, a region between a position separated by 0.50 W in the tire width direction from the tire equator and the tire equator is referred to as an inner region, and a region between the position separated by 0.50 W in the tire width direction from the tire equator and the tread edge is referred to as an outer region, the second groove portions being curved or bent such that an average angle of the second groove portions with respect to the tire circumferential direction in the inner region becomes smaller than an average angle of the second groove portions with respect to the tire circumferential direction in the outer region; and
    circumferential narrow grooves that connect mutual second groove portions adjacent in the tire circumferential direction on the one side or an other side of the tire equator being formed, a plurality of blocks being defined by the lug grooves and the circumferential narrow grooves, the blocks including center blocks and shoulder blocks, the center blocks being defined on the tire equator side with respect to the circumferential narrow grooves, the shoulder blocks being defined on the tread edge side with respect to the circumferential narrow grooves, a shallow groove having at least one bend point being formed on a road contact surface of each of the blocks; wherein
    the shallow grooves formed in the center blocks have ends that communicate with the circumferential narrow grooves,
    the shallow grooves formed in the center blocks have other ends that communicate with the second groove portions,
    projection components of the shallow grooves when the shallow grooves formed in the center blocks are projected to the tire equator mutually do not overlap, and
    the second groove portion of the lug groove has a groove depth from 15 mm to 25 mm.

2. The pneumatic tire according to claim 1, wherein the shallow groove formed in each shoulder block has both ends that terminate in the block, and the shallow groove is disposed on the stepping side with respect to a position of an apex inward in the tire width direction of a road contact surface of the shoulder blocks block.

3. The pneumatic tire according to claim 2, wherein the first groove portion has an angle of from 80° to 100° with respect to the tire circumferential direction, the shallow groove formed in each center block includes a part that intersects with the tire equator and linearly extends at an angle of from 80 to 90° with respect to the tire circumferential direction.

4. The pneumatic tire according to claim 3, wherein the average angle of the second groove portions with respect to the tire circumferential direction in the inner region is from 35° to 45°, the shallow groove formed in the each center block includes a linear part, and the linear part extends at an angle from 35° to 45° with respect to the tire circumferential direction and communicates with the circumferential narrow groove.

5. The pneumatic tire according to claim 4, wherein the shallow groove formed in each shoulder block extends along an outer edge on the stepping side of the shoulder block at a position separated by from 8 mm to 12 mm from the outer edge on the stepping side of the shoulder blocks block.

6. The pneumatic tire according to claim 5, wherein each shallow groove has a groove depth from 1 mm to 3 mm.

7. The pneumatic tire according to claim 6, wherein a groove depth of the first groove portion of the lug groove is from 65% to 75% of a groove depth of the second groove portion.

8. The pneumatic tire according to claim 7, wherein a groove depth of the circumferential narrow groove is from 75% to 85% of a groove depth of the second groove portion of the lug groove.

9. The pneumatic tire according to claim 8, wherein a tread rubber constituting the tread portion has JIS-A hardness from 61 to 70 and a modulus at 100% elongation from 2.0 MPa to 3.0 MPa.

10. The pneumatic tire according to claim 1, wherein the first groove portion has an angle of from 80° to 100° with respect to the tire circumferential direction, the shallow groove formed in each center block includes a part that intersects with the tire equator and linearly extends at an angle of from 80° to 90° with respect to the tire circumferential direction.

11. The pneumatic tire according to claim 1, wherein the average angle of the second groove portions with respect to the tire circumferential direction in the inner region is from 35° to 45°, the shallow groove formed in each center block includes a linear part, and the linear part extends at an angle from 35° to 45° with respect to the tire circumferential direction and communicates with the circumferential narrow groove.

12. The pneumatic tire according to claim 1, wherein the shallow groove formed in each shoulder block extends along an outer edge on the stepping side of the shoulder block at a position separated by from 8 mm to 12 mm from the outer edge on the stepping side of the shoulder block.

13. The pneumatic tire according to claim 1, wherein each shallow groove has a groove depth from 1 mm to 3 mm.

14. The pneumatic tire according to claim 1, wherein a groove depth of the first groove portion of the lug groove is from 65% to 75% of a groove depth of the second groove portion.

15. The pneumatic tire according to claim 1, wherein a groove depth of the circumferential narrow groove is from 75% to 85% of a groove depth of the second groove portion of the lug groove.

16. The pneumatic tire according to claim 1, wherein
a tread rubber constituting the tread portion has JIS-A hardness from 61 to 70 and a modulus at 100% elongation from 2.0 MPa to 3.0 MPa.

* * * * *